(12) United States Patent
Pujol et al.

(10) Patent No.: US 10,890,145 B2
(45) Date of Patent: Jan. 12, 2021

(54) PULSATIONS DAMPENING DEVICE

(71) Applicant: AKWEL, Champfromier (FR)

(72) Inventors: Olivier Pujol, Avignon (FR); Nacim Ould Ouali, Avignon (FR)

(73) Assignee: AKWEL, Champfromier (FR)

( * ) Notice: Subject to any disclaimer, the term of this patent is extended or adjusted under 35 U.S.C. 154(b) by 27 days.

(21) Appl. No.: 16/394,405

(22) Filed: Apr. 25, 2019

(65) Prior Publication Data

US 2019/0331071 A1 Oct. 31, 2019

(30) Foreign Application Priority Data

Apr. 25, 2018 (FR) ..................................... 18 00442

(51) Int. Cl.
*F02M 37/00* (2006.01)
*F02M 55/04* (2006.01)
*F17D 1/20* (2006.01)

(52) U.S. Cl.
CPC ........ *F02M 37/0041* (2013.01); *F02M 55/04* (2013.01); *F02M 2200/315* (2013.01); *F17D 1/20* (2013.01)

(58) Field of Classification Search
CPC ............... F02M 37/0041; F02M 55/04; F02M 2200/315; F17D 1/20; F16L 55/053
See application file for complete search history.

(56) References Cited

U.S. PATENT DOCUMENTS

| | | | |
|---|---|---|---|
| 2,283,439 A * | 5/1942 | Herman | F15B 1/10 138/30 |
| 2,757,689 A * | 8/1956 | Knox | F16L 55/053 138/30 |
| 4,723,577 A | 2/1988 | Wusterbarth | |
| 8,397,696 B2 * | 3/2013 | Hanjagi | F02M 37/0041 123/447 |
| 9,234,531 B2 * | 1/2016 | Wald | B60T 17/04 |
| 2008/0289713 A1* | 11/2008 | Munakata | F04B 11/0016 138/26 |
| 2014/0000740 A1 | 1/2014 | Wald et al. | |

FOREIGN PATENT DOCUMENTS

WO 2016/138219 A1 9/2016

* cited by examiner

*Primary Examiner* — Xiao En Mo
(74) *Attorney, Agent, or Firm* — Oliff PLC

(57) ABSTRACT

A device for dampening pulsations of a fluid includes a case which includes an upper portion and a lower portion and a diaphragm elastically deformable between a rest position and a stressed position, arranged inside the case so that the diaphragm delimits, together with the lower portion, a fluid-tight chamber. More particularly, the diaphragm has, in the rest position, a general shape of revolution around a main axis of the device cambered towards the outside of the chamber. Furthermore, the profile of the diaphragm has according to an axial section of the diaphragm at least one undulation projecting towards the inside of the chamber in the rest position so as to form an area of preferred deformation towards the inside of the chamber in the stressed position of the diaphragm.

15 Claims, 6 Drawing Sheets

PULSATIONS DAMPENING DEVICE

The present invention concerns a device for dampening pulsations of a fluid, and in particular a dampener intended to be integrated to a fuel supply circuit of a motor vehicle. Such a dampening device may be used in particular to dampen the pulsations of a fuel supply circuit of diesel and petrol engines of a motor vehicle.

In general, the fuel supply circuits of internal combustion engines are subjected to pressure pulsations problems. In general, these pressure pulsations result in vibrating the fluid, this vibration being caused by different components of the motor vehicle, such as for example the boost pump, the injectors' rail or else a high-pressure pump that is provided on fuel supply circuits.

These pressure pulsations may lead to dysfunctions such as injection defects but also to acoustic disturbances for the users of the motor vehicle, in particular by the transmission of the vibrations of the fuel circuit to the bodywork of the vehicle, and which are particularly uncomfortable.

There is already known from the state of the art, in particular from the document U.S. Pat. No. 8,397,696, a pulsations dampener for a fuel supply circuit. The pulsations dampener comprises a casing which delimits an inner volume inside which extend a diaphragm and a variable-stiffness spring adapted to urge the diaphragm in displacement via a protective shell of the diaphragm.

The diaphragm delimits, together with a portion of the casing, a tight chamber in which the spring is displaced. This diaphragm is likely to be deformed in order to follow the movement of the spring in response to the stresses of the pressure pulsations and thus modify the volume of the tight chamber.

Such a solution requires a large number of parts, in particular a variable-stiffness spring as well as a protective shell of the diaphragm, otherwise the diaphragm might be degraded by the spring. Yet, a complex arrangement lowers the robustness of the device and turns out to be particularly expensive.

The present invention aims at overcoming the above-mentioned drawbacks, by providing a pulsations dampening device with a simple design, requiring a reduced number of parts and having a very great robustness.

Another object of the invention is to provide a device for dampening pulsations in a wide frequency range yet without affecting the simplicity of the device.

To this end, an object of the present invention is a device for dampening pulsations of a fluid, such as a fluid flowing in a fuel supply circuit of the type comprising:
- a case which comprises an upper portion and a lower portion and at least one orifice for connecting the device to the circuit,
- a diaphragm elastically deformable between a rest position and a stressed position and arranged inside the case so that the diaphragm delimits, together with the lower portion, a fluid-tight chamber, characterized in that the diaphragm has, in the rest position, a general shape of revolution around a main axis of the device cambered towards the outside of the chamber and is provided with a peripheral foot and an apex, in that the profile of the diaphragm has according to an axial section of the diaphragm at least one undulation projecting towards the inside of the chamber in the rest position so as to form an area of preferred deformation towards the inside of the chamber in the stressed position of the diaphragm and in that the undulation delimits a peripheral main portion with an annular general shape and a central secondary portion with a dome-like general shape, the central portion having a radius of curvature smaller than that of the peripheral portion.

Thanks to its preferred deformation area, the diaphragm has a more robust design. Indeed, when pulsations are imparted to the diaphragm, the deformation is controlled.

It is also possible to manufacture this diaphragm very simply by preforming it, for example, and then by molding plastic material in a mold, this preform including areas of preferred deformation.

A pulsations dampening device may comprise one or more of the following features.

According to a preferred embodiment of the invention, the undulation delimits at least two separate and coaxial portions, each being associated to a pulsations dampening frequencies spectrum.

According to another preferred embodiment of the invention, the undulation is circumferential and formed by a double-inflection of the diaphragm in order to delimit a peripheral convex portion with an annular general shape and a dome-shaped central convex portion.

According to another preferred embodiment of the invention, the ratio of the radii of curvature of the central portion and of the peripheral portion is comprised between 0.2 and 0.4.

According to another preferred embodiment of the invention, the annular portion is shaped so as to dampen the pulsations in a low-frequency range and the dome-like portion is shaped so as to dampen the pulsations in a high-frequency range.

According to another preferred embodiment of the invention, the thickness of the diaphragm is heterogeneous.

According to another preferred embodiment of the invention, the thickness of the diaphragm is larger at the foot of the diaphragm than at its apex.

According to another preferred embodiment of the invention, the thickness of the diaphragm decreases substantially regularly from the foot to its apex or the diaphragm is thinned around its apex starting from the undulation.

According to another preferred embodiment of the invention, the diaphragm includes at least locally a reinforcing layer to rigidify the diaphragm within a delimited area.

According to another preferred embodiment of the invention, the diaphragm is thickened at its foot to form a sealing bulge.

According to another preferred embodiment of the invention, the device comprises a ring for retaining the diaphragm adapted to cooperate with the diaphragm so as to compress the foot of the diaphragm against the lower portion.

According to another preferred embodiment of the invention, the retaining ring has openings intended to coincide at least partially with the two orifices of the case in order to let the fluid pass throughout the case.

According to another preferred embodiment of the invention, the ring is integrally made with the upper portion of the device or the ring comprises means for indexing with respect to the upper portion and/or the lower portion.

According to another preferred embodiment of the invention, a valve is disposed on the lower portion and configured to make air pass selectively from the outside towards the inside of the tight chamber. Preferably, the valve consists of an umbrella-type check valve.

According to another preferred embodiment of the invention, the diaphragm is essentially made of a plastic material.

Other features and advantages of the invention will come out in light of the following description, made with reference to the appended drawings in which.

Figure 1:
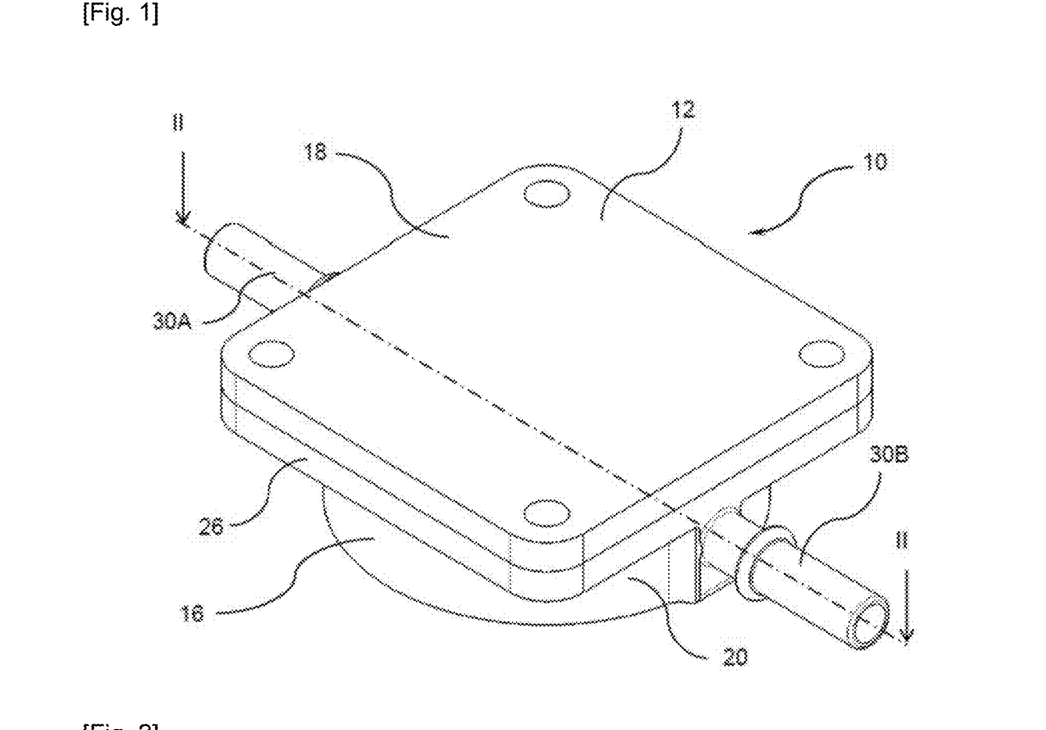
FIG. 1 is a perspective view of a device for dampening pulsations according to the invention.

A device for dampening pulsations of a fluid, such as a fluid flowing in a fuel supply circuit, is schematically represented in FIG. 1. In the following description, the device will be referred to by the general reference 10.

Referring to FIGS. 1 to 4, the device for dampening pulsations according to the invention includes a casing or case 12. For example, this case 12 is made of a plastic material. For example, the case 12 is made of an injected plastic which may be charged or not. For example, the plastic material essentially comprises at least one aliphatic polyamide, for example PA66, PA12 or at least Polyphthalamide (PPA). Alternatively, the case 12 may be made of a metallic material, for example an aluminum alloy.

Figure 2:
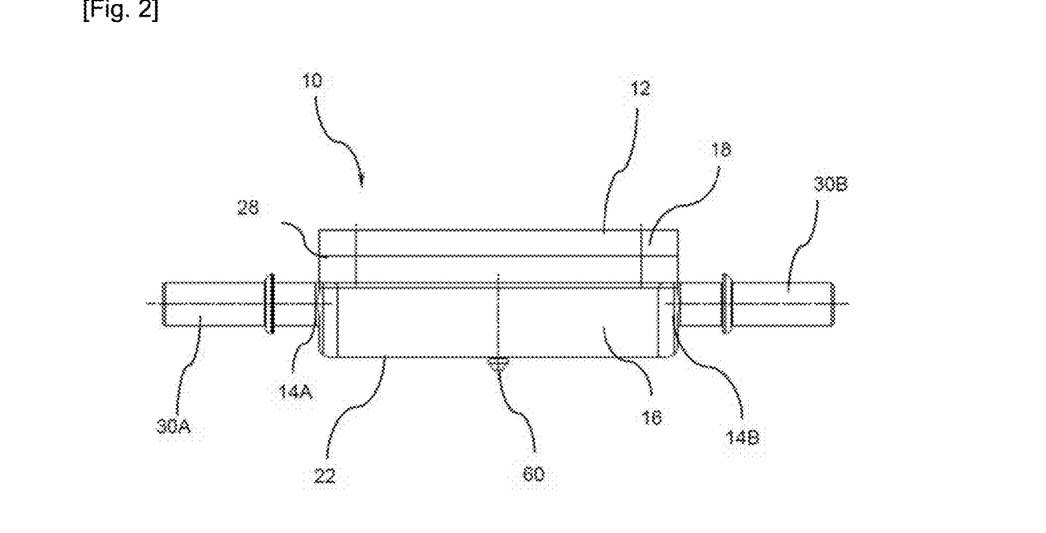
FIG. 2 is a side view of the device of FIG. 1.

As shown in FIG. 2, the case 12 comprises at least two orifices 14 for connecting the device 10 to the circuit (not represented) so that the two orifices 14 delimit a flow path of the fluid through the case 12.

Figure 3:
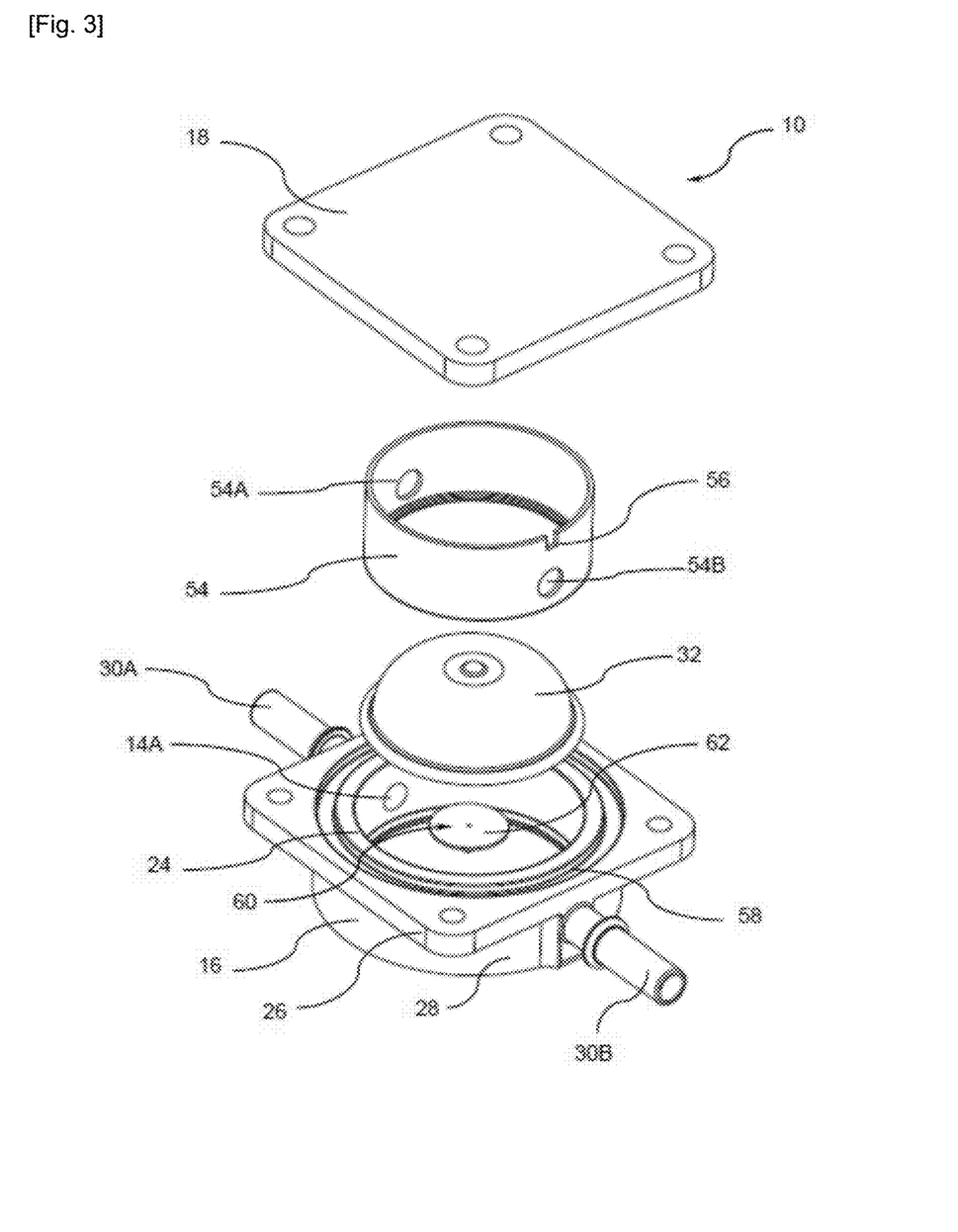
FIG. 3 is an exploded perspective view of the device of FIG. 1.

As illustrated in FIG. 3, the case 12 is made into at least two portions: a lower portion 16 and an upper portion 18. In a possible variant, the case 12 comprises one single orifice for connecting the device to the circuit such that the fluid comes in and out by the same orifice. Furthermore, depending on the configuration of the circuit to dampen, the lower portion 16 may include more than two orifices 14.

Figure 4:
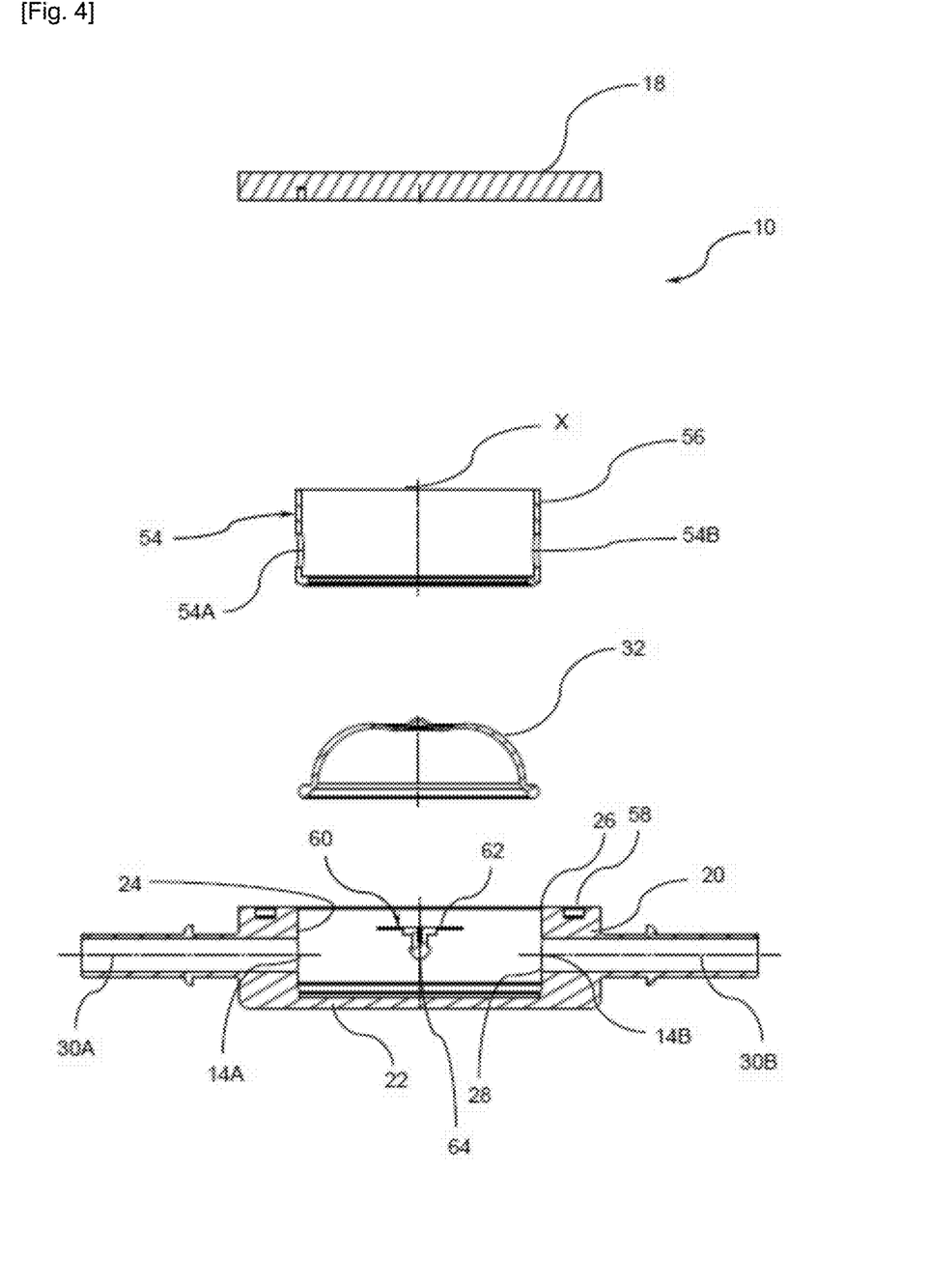
FIG. 4 is an exploded axial sectional view of the device of FIG. 3.
Figure 5:
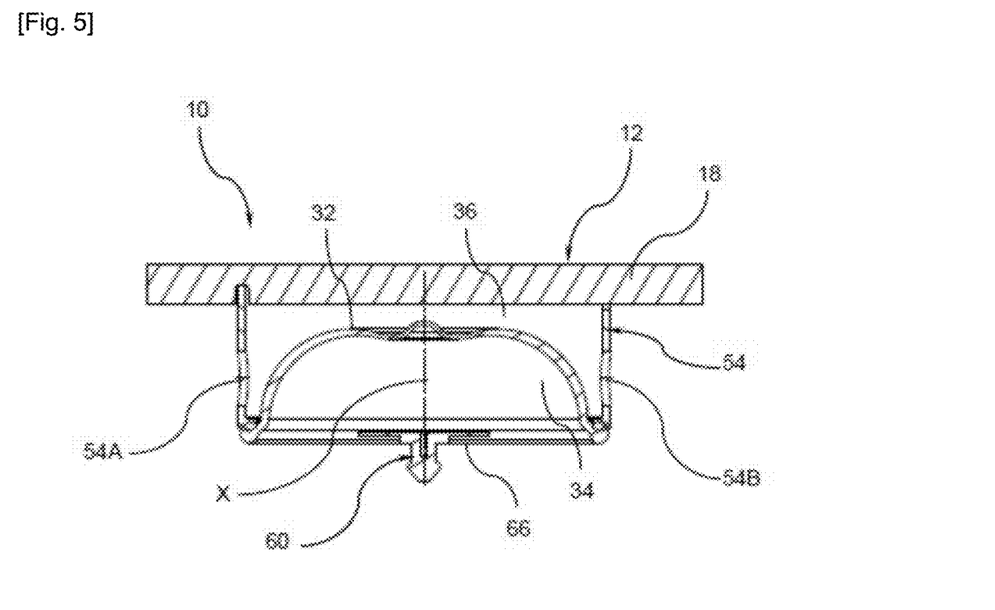
FIG. 5 is an axial sectional view of a portion of the dampening device of FIG. 1.
Figure 6:
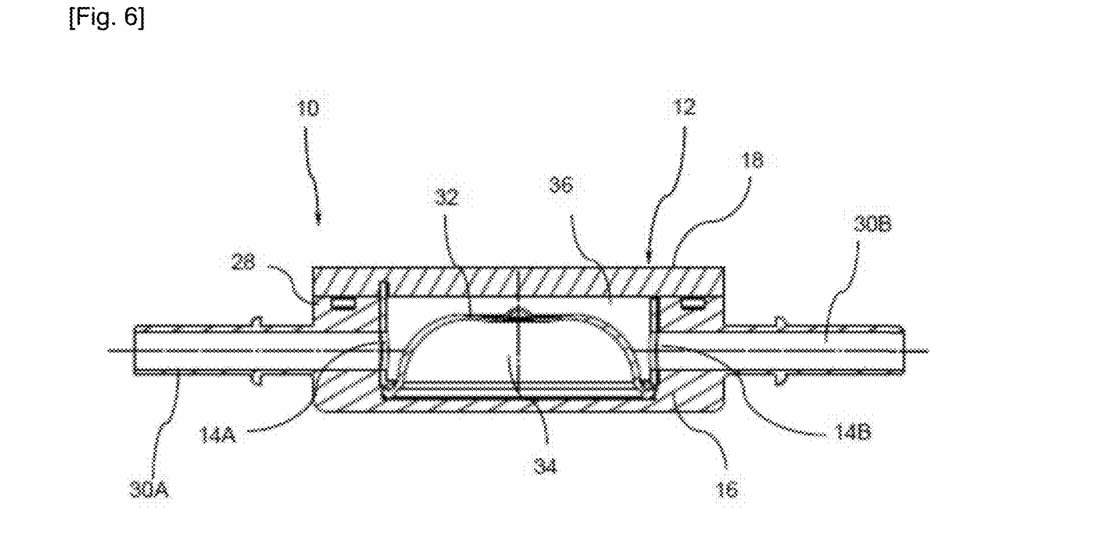
FIG. 6 is an axial sectional view of the dampening device of FIG. 1.

The lower portion 16, shown in particular in section in FIG. 4, herein comprises a main body 20, for example in the form of a basin, provided with a bottom 22 and opposite thereto an open end 24 delimited by a peripheral edge 26.

The lower portion 16 further comprises a lateral wall 28 linking the bottom 22 to the peripheral edge 26. In this example, the peripheral edge 26 extends in the continuation of the wall 28 projecting outwardly substantially over the entire contour of the wall 28.

Preferably, the body 20 has a substantially cylindrical general shape around a first axis X and the peripheral lateral wall 28 has an annular general shape around the axis X. The projecting peripheral edge 26 delimits the open end 24 with a circular internal contour, in this example, and has a square-shaped external contour. Of course, other shapes may be appropriate.

Furthermore, this lower portion 16 preferably comprises a first orifice 14A and a second orifice 14B distinct from the first orifice 14A for connecting the case 12 to the fuel supply circuit opening for example inside the body 20 (FIG. 2).

More specifically, in the example described hereinafter, the lower portion 16 includes a first endpiece 30A in which the first orifice 14A is formed and a second endpiece 30B in which the second orifice 14B is formed. Thus, the device 10 according to the invention is herein intended to be connected to the fuel supply circuit (not represented herein) preferably via the endpieces 30A, 30B. The first endpiece 30A and the second endpiece 30B are preferably formed integrally with the body 20 of the lower portion 16. For example, the first endpiece 30A and the second endpiece 30B have a substantially cylindrical shape and extend according to an axis perpendicular to the first axis X. Hence, the endpieces 30A and 30B extend radially to the body 20 of the lower portion 16. In the present description, the longitudinal axes of the endpieces 30A and 30B are aligned. Nonetheless, alternatively, depending on the configuration of the fuel circuit to dampen, the endpieces 30A and 30B may be not aligned.

The upper portion 18 of the case 12 will now be described with reference to FIGS. 1 to 4. Preferably, the upper portion 18 forms a cap for sealing the lower portion 16 and comprises in this example a body with a plate-like general shape. For example, the plate has a square general shape which match with the shape of the projecting edge 26 of the lower portion 16. The cap 18 and the lower portion 16 are assembled by means of the projecting edge 26 of the lower portion 16 by conventional linking means.

To this end, the cap 18 and the projecting edge 26 are provided with mounting orifices enabling fastening of the two portions of the case 12 by screws or other appropriate fastening means, etc. In this case, preferably, as shown in FIG. 3, the case 12 further comprises sealing means such as a peripheral groove 58 formed around the opening 24 in the lower portion 16 and configured to receive an O-ring gasket (not represented), made for example of an elastomer material.

Alternatively, the cap 18 and the lower portion 16 may be assembled by welding for example according to conventional methods: by ultrasounds, by heating blade, by rotation or by laser. Once assembled, the two lower 16 and upper 18 portions preferably delimit a tight internal volume of the case 12.

Of course, the device 10 may be configured in a different manner, whether with respect to the shape of its case 12, the fastening means, so as to enable it, depending on the configurations of the circuit to which it is attached, to be linked in a flexible or rigid manner to a member or to the bodywork of a motor vehicle.

In accordance with the invention, the device 10 further comprises an elastically-deformable diaphragm 32 intended to be arranged inside the case 12 as illustrated in FIG. 3.

The diaphragm 32 is arranged in the case 12 so that it delimits, together with one of the portions of the case 12, herein the lower portion 16, a lower chamber 34 sealed to the fluid flowing in the case 12 and an upper chamber 36 for fluid flow. Thus, the diaphragm 32 comprises an upper face in contact with the fluid in the upper chamber 36 and a lower face internal to the tight chamber 34.

The two endpieces 30A, 30B, via the two orifices 14A and 14B, thus define a flow path of the fuel through the case 12 and more specifically inside the upper chamber 36. The fuel flows in an upstream portion of the supply circuit before penetrating into the upper chamber 36 via the first endpiece 30A and the first orifice 14A. Then, the fuel circulates in the lower portion 16 until reaching the second portion 30B of the second orifice 14B and then flows towards the downstream portion of the supply circuit via the second endpiece 30B. Thus, the first orifice 14A defines a fuel inlet in the lower portion 16 and the second orifice 14B defines a fuel outlet in the lower portion 16.

Figure 11:
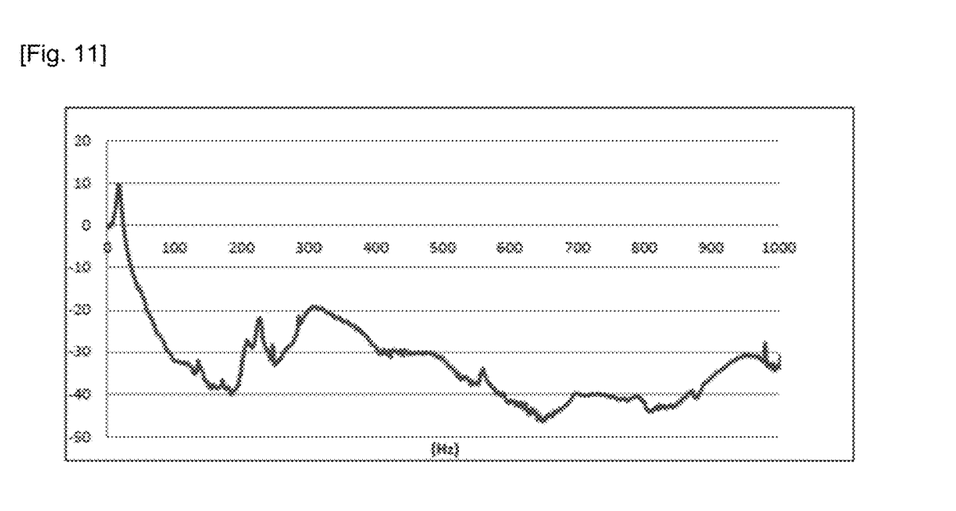
FIG. 11 is a graph representing a curve of the evolution of the attenuation in decibel of the pulsations as a function of frequency.

This diaphragm 32 is configured to be able to be deformed by its shape and the flexibility of its material under the effect of a nominal service pressure, for example a 1-bar relative pressure and especially to dampen the pressure pulsations around this service pressure. The amplitude of the pulsations may reach one bar relative to this service pressure. The diaphragm 32 is designed to operate with a white noise over a frequency range comprised between five Hertz and one thousand Hertz. There is represented in FIG. 11 a graph representing a curve of the evolution of the attenuation in decibel as a function of frequency. The curve presents a cutoff frequency around 25 Hertz. In general, the first frequencies to be dampened are located in the range of 35 Hertz . . . .

For example, the diaphragm 32 is constituted by a material which promotes its deformation to enable an effective dampening of pressure peaks and has a specific shape to facilitate such a deformation. For example, this diaphragm 32 is constituted by a material adapted to resist the conditions of use and depends in particular on the chemical nature of the fuels that may be used. For example, the diaphragm 32 is basically made of fluoroelastomer FKM, HNBR (acronym of «Hydrogenated Nitrile Butadiene Rubber») or Fluorosilicone. Preferably, the diaphragm 32 is made of an elastomer-based or rubber-based material. The diaphragm 32 may be made of a thermoformed or injected elastomer depending on its material and its geometry.

Figure 7:
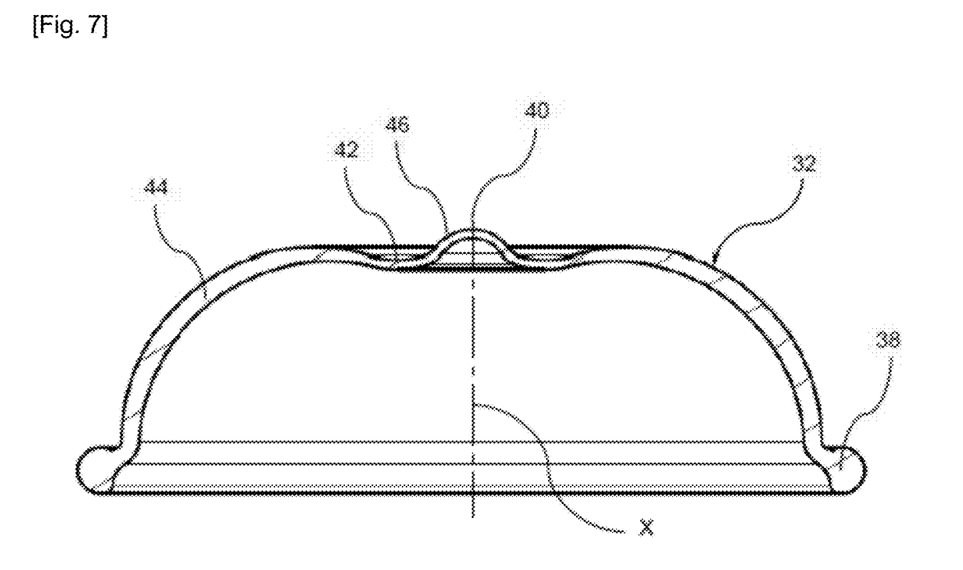
FIGS. 7 and 8 are sectional views of a diaphragm of the device of FIG. 1 respectively in a rest and deformed state.
Figure 8:
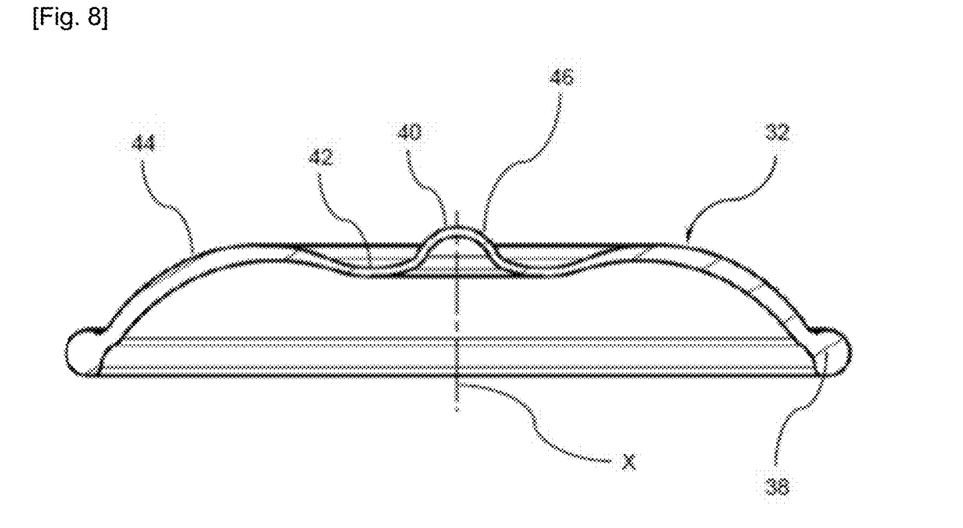

Furthermore, as illustrated in detail in particular in FIGS. 7 and 8, the diaphragm 32 is elastically deformable between a rest position (illustrated in FIG. 7) and a stressed position (illustrated in FIG. 8). Thus, the diaphragm 32 has, in the rest position, as shown in FIG. 7, a general shape of revolution around the main axis X of the device 10 cambered towards the outside of the lower chamber 34 and is provided with a peripheral foot 38 and an apex 40.

Moreover, in accordance with the invention, the profile of the diaphragm 32 has, according to an axial section of the diaphragm 32, at least one undulation 42 projecting towards the inside of the lower chamber 34 in the rest position so as to form an area of preferred deformation towards the inside of the lower chamber 34 in the stressed position of the diaphragm 32.

With this preferred deformation, the diaphragm 32 allows avoiding a premature wear caused by an uncontrolled deformation of the diaphragm for example in the direction opposite to its curvature which would result in weakening of the diaphragm. This allows improving the properties of resistance to continuous operation pressures without any irreversible deformation of the diaphragm 32.

The shield-like shape of the diaphragm 32 also serves to facilitate the deformation and to protect it in case of overpressure. The undulation 42 ensures a mechanical robustness of the product by loading the diaphragm in the same direction as its radius at the level of the undulation.

Preferably, the undulation 42 delimits at least two separate and coaxial portions 44, 46, each being associated to a pulsations dampening frequencies spectrum. This allows dampening the pulsations over a wider frequency range.

For example, the undulation 42 is circumferential and formed by a double-inflection of the diaphragm 32 in order to delimit a peripheral convex portion 44 with an annular general shape and a dome-shaped central convex portion 46.

In the example illustrated in particular in FIG. 7, the undulation 42 delimits a peripheral main portion 44 with an annular general shape and a central secondary portion 46 with a dome-like general shape, the central portion 46 having a radius of curvature smaller than that of the peripheral portion 44. Preferably, the ratio of the radii of curvature of the central portion 46 and of the peripheral portion 44 is comprised between 0.2 and 0.4. Thus, the diaphragm 32 is in the form of two nested bells, a truncated large bell and a dome-shaped small bell extending at the truncated apex of the large bell.

Preferably, the annular portion 44 is shaped so as to dampen the pulsations in a low-frequency range, for example frequencies lower than 400 Hz and the dome-like portion 46 is shaped so as to dampen the pulsations in a high-frequency range, for example frequencies comprised between 400 Hz and 600 Hz.

In some variants, those skilled in that art can adapt the radius of curvature of the portions of the diaphragm 32, their depth, their shape (conical, spherical profile), the thicknesses and the material constitutive of the diaphragm 32 according to the desired dampening characteristics. For example, it will be noted that, in order to increase frequency, in the same manner as a diaphragm of a loudspeaker, the central portion 46 should have a smaller radius.

In order to enhance its rigidity, the diaphragm 32 may include at least locally a reinforcing layer interposed between two layers of an elastomer material or simply bonded to the elastomer material (on the side which is not in contact with fuel). For example, the diaphragm may include a rigidifying tress made of a material essentially comprising polyacrylamide, aramid, polyamide or from synthetic fibers such as Kevlar®, a thermoplastic polymer belonging to the aramids family or with a reinforcing fabric made of a material such as a meta-aramid for example commercialized under the brand Nomex®.

For example, the diaphragm 32 is manufactured by pressing multiple layers between which the reinforcing layer is interposed and then by vulcanizing the layers in order to merge them. An advantage of a diaphragm 32 thus thermoformed compared to a conventional planar diaphragm of the prior art is to allow achieving sealing at the foot of the diaphragm by forming a bulge 38.

Preferably, the diaphragm 32 has a heterogeneous thickness. For example, the thickness of the diaphragm 32 is larger at the foot 38 of the diaphragm 32 than at its apex 40. In the example illustrated in FIG. 7, it is shown that the diaphragm 32 has a thinned thickness from the inflection area 42 towards the apex 40. Thus, the dome 46 has a thickness smaller than the annular portion 44.

Alternatively, the thickness of the diaphragm 32 decreases substantially regularly from the foot 38 towards its apex 40.

Thus, the device 10 according to the invention includes a limited number of parts. In order to enable its immobilization inside the case 12, the diaphragm is thickened at its foot to form a sealing bulge.

For example, as illustrated in FIG. 3, the device 10 further comprises a ring 54 for retaining the diaphragm 32. In order to enable the flow of fluid inside the case 12, the retaining ring 54 has openings 54A, 54B intended to lie in alignment respectively with the two orifices 14A, 14B of the case 12 in order to let the fluid pass throughout the case 12. Preferably, the ring 54 further comprises means 56 for indexing with respect to the upper portion 18 or with respect to the lower portion 16. For example, the indexing means 56 comprises a notch formed from an end edge of the ring 54 intended to cooperate with a lug formed on the lower portion 16 (not represented).

Alternatively, the ring 54 may be integrally made with the upper portion 18 of the device 10 by forming for example a peripheral internal skirt of the cap 18.

According to a particular embodiment which is not illustrated, the diaphragm may be pinched between the edge of the cap and the flange of the body so as to be held between the upper portion and the lower portion. In this case, the device does not comprise any retaining ring and the cap has for example a bell-like shape delimiting at least one or two orifice(s) for flow of the fluid inside the bell. This also allows reducing even further the number of parts in the device.

Moreover, possibly, as illustrated in FIGS. 2 to 5, the device 10 may comprise a flap 60 disposed on the lower portion 16 and configured to make air pass selectively from the outside to the inside of the lower tight chamber 34. This flap 60 has a contact area brought in tight contact with a flap seat 66. The flap seat 66 comprises an orifice and the flap 60 forms a member for sealing the orifice likely to adopt a sealing position and an opening position in order to make the external air pass selectively inside the tight chamber 34.

The higher the pressure difference between the fuel flow chamber 36 and the tight chamber 34, the less the diaphragm 32 will be effective. Indeed, in case of a depression, the diaphragm 212 will be already in a deformed state even before the apparition of a pressure pulsation. In particular, such a depression may cause a risk of tearing of the diaphragm over time.

In the described example, the flap 60 comprises a body constituted by a corolla 62 and by a rod 64 linked at one of its ends to the center of the corolla 62. The corolla 62 forms, together with the rod 64, a somehow mushroom- or umbrella-like shape. The rod 64 is intended to be engaged inside the sealing orifice.

The operation of the flap 60 is as follows: as long as the tight chamber 34 has a pressure higher than the external pressure, the flap 60 remains in the closed position. The effect of this pressure is to strongly press the corolla on the flap seat in a tight manner.

In the case where the pressure of the lower chamber 34 decreases and passes below the external pressure, the corolla 62 is slightly deformed and the contact between the corolla 62 and the seat of the flap ceases. Then, the external air can penetrate inside the lower chamber 34 to balance the pressure.

For example, the tight chamber may be subjected to a depression caused by a possible leakage of air throughout the diaphragm or the body of the case 12 which may cause the collapse of the diaphragm and therefore a less effective operation. Furthermore, advantageously, this vent allows avoiding a possible condensation of the fuel vapors which may diffuse by permeability though the thickness of the diaphragm or else in sealing areas of the device.

Alternatively, the valve may also be advantageously replaced, when the targeted dampening performance enables it, by at least one small-diameter hole, for example smaller than one millimeter, pierced in the lower portion 16. In this case, it is necessary to preferably provide for a return element such as a spring of the diaphragm.

According to a particular embodiment, the lower portion 16 (body 20, first endpiece 30A, second endpiece 30B) is integrally molded. Similarly, the upper portion 18 (cap) is integrally molded. During the mounting of the device 10, all it needs is to assemble the lower portion 16 and the cap 18 while trapping the diaphragm 32 between the two portions. Thus, the manufacture of the device according to the invention turns out to be particularly simple and rapid.

Figure 9:
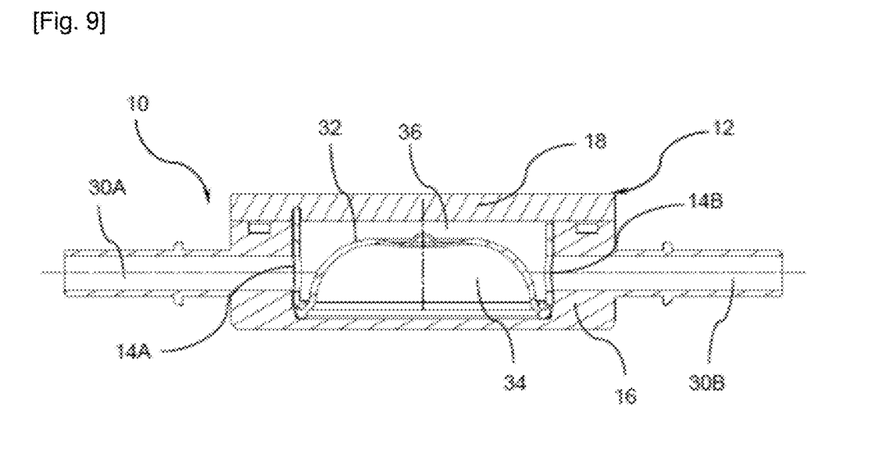
FIGS. 9 and 10 represent the device for dampening pulsations of FIG. 1 in a rest state and in a deformed state.

The main aspects of the operation of the invention will now be described with reference to FIGS. 9 to 10.

The device 10 is shaped so as to be triggered at a pressure Po prevailing in the upper chamber 36. In the rest position, as illustrated in FIG. 9, when the pressure in the upper chamber 14 is lower than Po, the diaphragm 32 has a cambered general shape.

Figure 10:
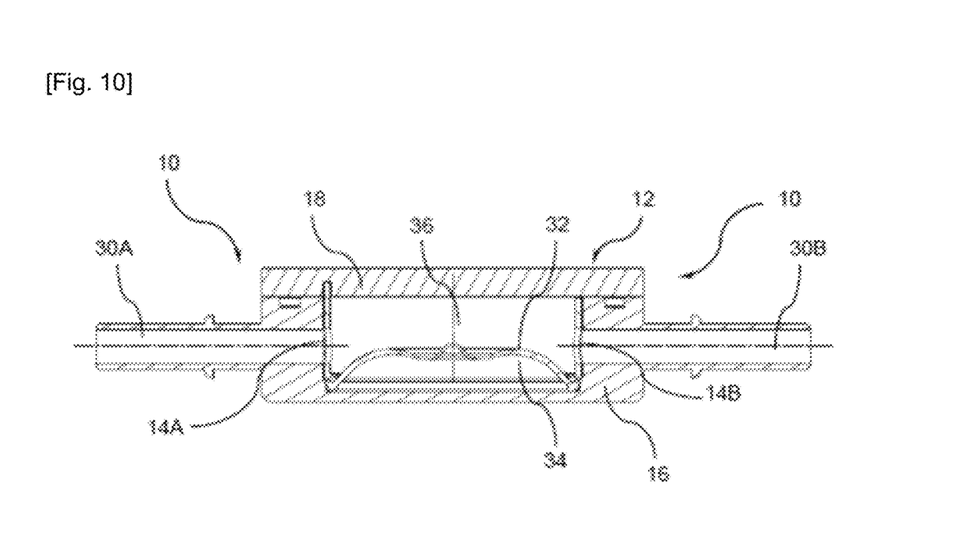

In the dampening position, as illustrated in FIG. 10, when the pressure in the upper chamber 36 becomes higher than Po, the diaphragm 32 is deformed in the direction of the lower chamber 34 according to the preferred deformation area. This enlarges the volume of the upper chamber 36 which allows lowering the pressure prevailing in the upper chamber 36 and therefore in the supply circuit. The dampening is largely achieved by the air trapped under the diaphragm (viscosity of air, heat-up).

Depending on the frequency and amplitude range of the frequency pulsations, the diaphragm 32 is loaded differently. For example, in the case of high frequencies and low amplitudes of pulsation, the central portion 46 of the diaphragm 32 is particularly loaded. In contrast, in the case of low frequencies and high amplitudes of pulsation, the peripheral portion 44 of the diaphragm 32 is preferably loaded. This shaping of the diaphragm into two bells allows covering a wider frequency range than with a diaphragm with a cambered simple shape.

Thus, it is possible to consider that the dome 46 and the peripheral portion 44 behave as two diaphragms each associated to an attenuation frequencies spectrum and mounted coaxially. According to some variants, those skilled in the art can adapt the diameter of the diaphragms, their depth and their shape (in particular a conical, spherical profile) according to the pursued attenuation characteristics.

Of course, the invention is not limited to the described embodiment and variants may be brought thereto without departing from the scope of the invention as defined by the claims. In particular, the diaphragm may be held between the upper portion and the lower portion otherwise than by being pressed between the upper portion and the lower portion or than with a retaining ring.

The upper portion and/or the lower portion may comprise areas with a particular coating or a particular surface condition, which will be in contact with the diaphragm to hold the diaphragm in place between the upper portion and the lower portion. The upper portion and/or the lower portion may include areas with particular shapes adapted to hold the diaphragm in place between the upper portion and the lower portion.

In particular, the internal shapes of the cap 18, of the retaining ring 54 and/or the lower portion 16, may comprise protrusions, or baffles, aiming at attenuating the pulsations of the fluid in operation like «breakwaters».

Similarly, the diaphragm may include over its face in contact with the fluid, protrusions aiming at breaking the pulsations of the fluid, placed such that they do not hinder the deflection of the diaphragm.

Although the first orifice and the second orifice are herein formed in the endpieces of the device for dampening pulsations, the device may include no endpieces. The smooth or threaded orifices may then be formed for example in a lateral wall of the body of the lower portion. The device may then be connected to the supply circuit for example, by fittings screwed in the lateral wall, or by welding of the lower portion at the level of its orifices to two corresponding conduits of the supply circuit. The endpieces may have a shape different from that illustrated.

For higher pressures, in order to avoid a too high pressure difference between that on the fuel side and that of the tight area, resulting in a too significant deformation of the diaphragm in the rest position, a support such as a spring or else foam may be added in order to counter this difference. A compressed gas may also be added in the tight area in order to adapt the pressures.

The invention claimed is:

1. A device for dampening pulsations of a fluid, the device comprising:
   a case which comprises an upper portion and a lower portion and at least two orifices for connecting the device so that the two orifices delimit a flow path of the fluid through the case;
   a diaphragm elastically deformable between a rest position and a stressed position and arranged inside the case so that the diaphragm delimits, together with the lower portion, a fluid-tight chamber,
   wherein the diaphragm has, in the rest position, a general shape of revolution around a main axis of the device cambered towards an outside of the chamber and is provided with a peripheral foot and an apex; and
   wherein a profile of the diaphragm has, according to an axial section of the diaphragm from the peripheral foot to the apex, a main portion curved towards the outside of the chamber with a first radius of curvature, at least one undulation protruding towards an inside of the chamber in the rest position to form a zone of preferential deformation towards the inside of the chamber in the rest position of the diaphragm and a central secondary portion having a second radius of curvature smaller than the first radius of curvature of the main portion, said undulation delimiting at least two separate and coaxial portions, each being associated to a pulsations dampening frequencies spectrum.

2. The device according to claim 1, wherein the first radius of curvature of the main portion is constant from the peripheral foot to the undulation and the second radius of curvature of the central secondary portion is constant from the undulation to the apex.

3. The device according to any claim 1, wherein the undulation is circumferential and formed by a double-inflection of the diaphragm in order to delimit a peripheral convex portion with an annular general shape and a dome-shaped central convex portion.

4. The device according to claim 1, wherein the ratio of the radii of curvature of the central portion and of the peripheral portion is comprised between 0.2 and 0.4.

5. The device according to claim 3, wherein the annular portion is shaped so as to dampen the pulsations in a low-frequency range and the dome-like portion is shaped so as to dampen the pulsations in a high-frequency range.

6. The device according to claim 1, wherein the thickness of the diaphragm is heterogeneous.

7. The device according to claim 1, wherein the thickness of the diaphragm is larger at the foot of the diaphragm than at its apex.

8. The device according to claim 1, wherein the thickness of the diaphragm decreases substantially regularly from the foot to its apex or wherein the diaphragm is thinned around its apex starting from the undulation.

9. The device according to claim 1, wherein the diaphragm includes at least locally a reinforcing layer to rigidify the diaphragm within a delimited area.

10. The device according to claim 1, wherein the diaphragm is thickened at its foot to form a sealing bulge.

11. The device according to claim 10, comprising a ring for retaining the diaphragm adapted to cooperate with the diaphragm so as to compress the foot of the diaphragm against the lower portion.

12. The device according to claim 11, wherein the retaining ring has openings intended to coincide at least partially with the two orifices of the case in order to let the fluid pass throughout the case.

13. The device according to claim 11, wherein the ring is integrally made with the upper portion of the device or wherein the ring comprises means for indexing with respect to the upper portion and/or the lower portion.

14. The device according to claim 1, comprising a valve disposed on the lower portion and configured to make air pass selectively from the outside towards the inside of the tight chamber.

15. The device according to claim 1, wherein the diaphragm is essentially made of an elastomer material.

* * * * *